US010173775B2

(12) United States Patent
Samaritano et al.

(10) Patent No.: US 10,173,775 B2
(45) Date of Patent: Jan. 8, 2019

(54) MODULAR THRUST SYSTEM (71) Applicant: The Boeing Company, Chicago, IL (US)

(72) Inventors: Anthony Samaritano, Toms River, NJ (US); Daniel I. Newman, Lafayette Hill, PA (US); Michael J. Duffy, Prospect Park, PA (US)

(73) Assignee: The Boeing Company, Chicago, IL (US)

( * ) Notice: Subject to any disclaimer, the term of this patent is extended or adjusted under 35 U.S.C. 154(b) by 484 days.

(21) Appl. No.: 14/531,826

(22) Filed: Nov. 3, 2014

(65) Prior Publication Data

US 2016/0123182 A1 May 5, 2016

(51) Int. Cl.
*B64C 39/02* (2006.01)
*B64C 27/08* (2006.01)
*B64C 27/20* (2006.01)

(52) U.S. Cl.
CPC ............ *B64C 39/026* (2013.01); *B64C 27/08* (2013.01); *B64C 27/20* (2013.01); *B64C 39/024* (2013.01);
(Continued)

(58) Field of Classification Search
CPC ............ B64C 2201/00; B64C 2201/02; B64C 2201/024; B64C 2201/027; B64C 2201/028; B64C 2201/108; B64C 2201/12; B64C 2201/126; B64C 2211/00; B64C 39/026; B64C 39/04; B64C 39/024; B64C 27/08
See application file for complete search history.

(56) References Cited

U.S. PATENT DOCUMENTS 9,457,899 B2 * 10/2016 Duffy ...................... B64C 37/02
9,481,471 B2 * 11/2016 Newman .................. F02K 3/00
(Continued)

FOREIGN PATENT DOCUMENTS

DE      102005061741 A1 *  7/2007   ............ B64C 27/08
DE      202015005962 U1 *  9/2015   ........... B64C 39/024
(Continued)

OTHER PUBLICATIONS

Ivan Stamatovski, at least Aug. 2014, www.kickstarter.com/projects/wiggly/easy-drone-the-first-modular-plug-and-fly-aerial-s/posts; Easy Drone—the first plug and fly aerial solution (Year: 2014).*
(Continued)

*Primary Examiner* — Benjamin P Lee
(74) *Attorney, Agent, or Firm* — Kunzler, PC (57) ABSTRACT Disclosed herein is one embodiment of a thrust system that includes at least one modular thrust unit and at least one control module. The at least one modular thrust unit includes a base that is made from structural members that are inter-connectable in a plurality of different structural configurations. The at least one modular thrust unit further includes at least one thrust generator coupleable to the base in a thrust configuration and at least one power source operable to deliver power to the at least one thrust generator. The at least one control module is coupleable to the at least one modular thrust unit and operable to control at least one of the at least one thrust generator and the at least one power source.

20 Claims, 10 Drawing Sheets

(52) U.S. Cl.
CPC .. *B64C 2201/027* (2013.01); *B64C 2201/108* (2013.01); *B64C 2211/00* (2013.01)

(56) References Cited

U.S. PATENT DOCUMENTS

| | | | |
|---|---|---|---|
| 2011/0057074 A1* | 3/2011 | Woodworth | B64C 15/00 244/175 |
| 2012/0158215 A1* | 6/2012 | Sun | B64C 27/20 701/3 |
| 2014/0061376 A1* | 3/2014 | Fisher | B64D 27/24 244/62 |
| 2014/0374532 A1 | 12/2014 | Duffy et al. | |
| 2016/0159471 A1* | 6/2016 | Chan | B64C 39/024 244/39 |
| 2016/0311526 A1* | 10/2016 | Geise | B64C 27/08 |
| 2016/0340028 A1* | 11/2016 | Datta | B64C 39/024 |
| 2016/0378108 A1* | 12/2016 | Paczan | G05D 1/0027 705/330 |

FOREIGN PATENT DOCUMENTS

| | | | | |
|---|---|---|---|---|
| WO | WO 2011149544 A1 * | 12/2011 | | A63H 27/04 |
| WO | WO 2014080386 A2 * | 5/2014 | | B64C 39/024 |
| WO | WO 2016027942 A1 * | 2/2016 | | B64C 39/024 |
| WO | WO 2016089882 A1 * | 6/2016 | | B64C 27/08 |

OTHER PUBLICATIONS

Raymond Oung et al. 2010 International Conference on Robotics and Automation Anchorage Convention District, May 3-8, 2010 "The Distributed Flight Array", paper (Year: 2010).*

* cited by examiner

MODULAR THRUST SYSTEM

FIELD

This disclosure relates generally to thrust systems, and more particularly to modular thrust systems.

BACKGROUND

Conventional thrust generating devices, such as rotor air vehicles, are specifically designed and configured to be used in certain niche applications or particular research projects. In other words, most conventional thrust generating devices are tailored for a specific end-use application. Accordingly, conventional thrust generating devices are not well-suited to be customized and/or modified for different end-use applications.

SUMMARY

The subject matter of the present application has been developed in response to the present state of the art, and in particular, in response to shortcomings of conventional thrust devices. The subject matter of the present application has been developed to provide a modular thrust system that is configurable and adaptable so as to be utilizable in a plurality of end-use applications.

Disclosed herein is one embodiment of a thrust system that includes at least one modular thrust unit and at least one control module. The at least one modular thrust unit includes a base that is made from structural members that are inter-connectable in a plurality of different structural configurations. The at least one modular thrust unit further includes at least one thrust generator coupleable to the base in a thrust configuration and at least one power source operable to deliver power to the at least one thrust generator. The at least one control module is coupleable to the at least one modular thrust unit and operable to control at least one of the at least one thrust generator and the at least one power source.

According to one implementation, the base includes at least one coupler mechanism for coupling together at least one other modular thrust unit to form an aggregated thrust unit. In another implementation, the at least one modular thrust unit has a plurality of modular thrust units, with each modular thrust unit being independently operable to generate thrust and the plurality of modular thrust units being interdependently operable to generate thrust when the plurality of modular thrust units are inter-coupled to form an aggregated thrust unit with an aggregated configuration.

In one implementation, the thrust system consists of at least one modular thrust unit and at least one control module. The at least one modular thrust unit includes a base that is made from structural members that are inter-connectable in a plurality of different structural configurations. The at least one modular thrust unit further includes at least one thrust generator coupleable to the base in a thrust configuration and at least one power source operable to deliver power to the at least one thrust generator. The at least one control module is coupleable to the at least one modular thrust unit and operable to control at least one of the at least one thrust generator and the at least one power source.

Also disclosed herein is another embodiment of a thrust system that includes a plurality of modular thrust units. Each modular thrust unit includes a base, at least one thrust generator coupleable to the base in a thrust configuration, and at least one power source operable to deliver power to the at least one thrust generator. The system further includes at least one control module coupleable to at least one of the plurality of modular thrust units and operable to control at least one of the at least one thrust generator and the at least one power source. Each modular thrust unit is independently operable to generate thrust and the plurality of modular thrust units are interdependently operable to generate thrust, wherein the plurality of modular thrust units are inter-coupleable to form an aggregated thrust unit having an aggregated configuration.

According to one implementation, the plurality of modular thrust units includes first modular thrust units that each have a first base having a first structural configuration and second modular thrust units that each have a second base having a second structural configuration, wherein the first structural configuration is different from the second structural configuration. The base may include structural members that are inter-connectable in a plurality of different structural configurations. The plurality of modular thrust units may have identical structural configurations and identical thrust configurations. In another implementation, each modular thrust unit includes an equal number of thrust generators and power sources.

In one implementation, the aggregated thrust unit has a single control module. In another implementation, the at least one control module includes a control module for each modular thrust unit that forms the aggregated thrust unit. In such an implementation, the control modules for each modular thrust unit are networked together, with one of the control modules being a master controller and the other of the control modules being slave controllers. The base may include at least one coupler mechanism for coupling together multiple modular thrust units to form the aggregated thrust unit. Also, each thrust generator of the at least one thrust generator may include a rotor.

Further disclosed herein is one embodiment of a thrust kit that includes a plurality of structural members inter-connectable to form a base having any one of a plurality of configurations. The kit further includes at least one thrust generator coupleable to the base in a thrust configuration and at least one power source coupleable to the base and operable to deliver power to the at least one thrust generator. The kit further includes at least one control module coupleable to the base and operable to control at least one of the at least one thrust generator and the at least one power source.

Still further, an embodiment is disclosed herein for a thrust method that includes providing a thrust kit that is configurable in a plurality of different configurations. Each configuration is associated with at least one thrust application of a plurality of different thrust applications. The method further includes identifying a specific thrust application from the plurality of different thrust applications and configuring the thrust kit to have a specific configuration, of the plurality of different configurations, that is associated with the identified specific thrust application.

According to one implementation, the thrust kit includes a plurality of structural members inter-connectable in a plurality of different structural configurations to form a base, at least one thrust generator coupleable to the base in a thrust configuration, at least one power source coupleable to the base and operable to deliver power to the at least one thrust generator, and at least one control module coupleable to the base and operable to control at least one of the at least one thrust generator and the at least one power source. In one implementation, configuring the thrust kit includes configuring the structural members to have a specific structural configuration associated with the identified specific thrust application.

In one implementation, the thrust kit may be utilized to form a plurality of modular thrust units, with each modular thrust unit being independently operable to generate thrust and the plurality of modular thrust units being interdependently operable to generate thrust. The plurality of modular thrust units are inter-coupleable to form an aggregated thrust unit having an aggregated configuration, wherein configuring the thrust kit comprises configuring the aggregated thrust unit to have a specific aggregated configuration. The method may also include using the thrust kit with the specific configuration for the specific thrust application.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
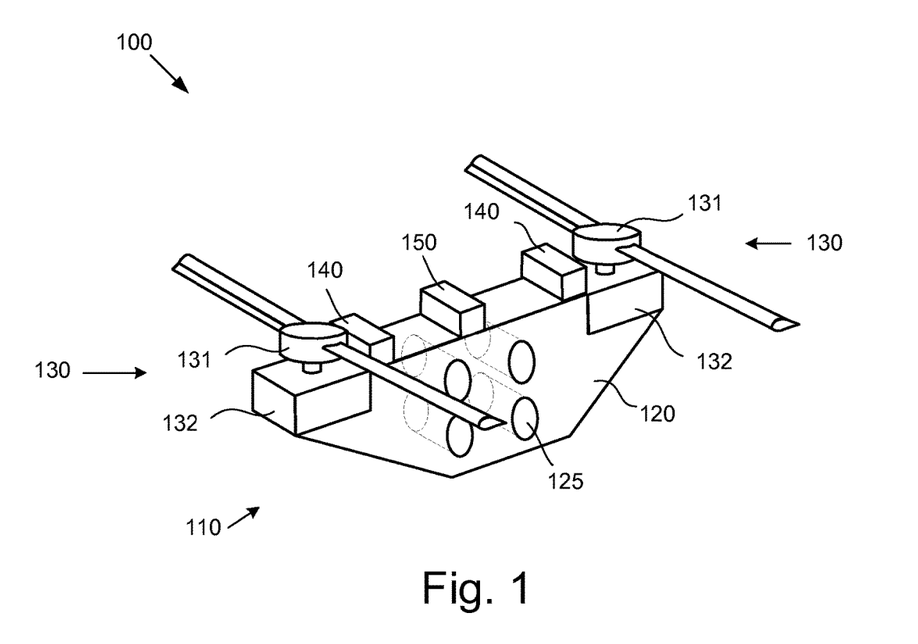
FIG. 1 is a top perspective view of one embodiment of a thrust system that includes one modular thrust unit.

FIG. 1 is a top perspective view of one embodiment of a thrust system 100 that includes a modular thrust unit 110. The modular thrust unit 110 in the depicted embodiment includes a base 120, two thrust generators 130, two power sources 140, and a control module 150. The thrust system, as described below, may be utilized in a variety of different thrust applications. For example, a user may employ the thrust system as an air vehicle to transport people or things through the air. In another embodiment, the thrust system may be used to generate a substantially horizontal thrust, thus propelling people and/or items horizontally along the ground. For example, the thrust system may be used to propel a boat across water, or to propel a sliding device across snow, among other thrust applications. Therefore, the thrust system of the present disclosure is capable of being used in a plurality of different thrust applications.

Although the modular thrust unit 110 in FIG. 1 is depicted as having two thrust generators 130, it is expected that each modular thrust unit may have a single thrust generator (or more than 2 thrust generators). In other words, throughout the pages of the present disclosure, the term modular thrust unit refers to the apparatus that can be implemented as a stand-alone thrust apparatus and that can be coupled together with other modular thrust units. Thus, the modular thrust unit is the structure that can be independently operated to create thrust while at the same time be jointly operated (with other modular thrust units) to create an aggregated thrust, as described below in greater detail. Accordingly, the depiction of the thrust unit in FIG. 1, which includes two thrust generators 130, is not intended to limit the scope of the disclosure to modular thrust units with two thrust generators. In other words, each modular thrust unit may have any number of thrust generators.

In the depicted embodiment, the two thrust generators 130 are coupled to the base 120 and the two power sources 140 are operable to deliver power to the thrust generators 130. The control module 150 is also coupled to the base 120 and is operable to control the two thrust generators 130 and/or the two power sources 140. As described in greater detail below, the number, configuration, arrangement, and interconnectivity of the base 120, thrust generators 130, power sources 140, and control module 150 of the modular thrust unit 110 may be adaptable and configurable according to the needs of a specific thrust application. Additionally, multiple modular thrust units 110 may be coupled together to form an aggregated thrust unit. Accordingly, the thrust system of the present disclosure, as described with reference to the remaining figures, generally overcomes the shortcomings of the prior art in or more of the following ways: 1) the components of each modular thrust unit may be configured and adapted to meet the needs/requirements of a specific thrust application; and 2) multiple modular thrust units may be coupled together to provide further flexibility in meeting the needs/requirements of the specific thrust application.

The base 120 of the modular thrust unit 110, according to one embodiment, may be constructed from a single, unitary material. In another embodiment, however, the base 120 may include multiple structural members (see FIGS. 2A-3) that are interconnectable. As seen in FIG. 1, the base 120 may include holes 125 that extend through the base 120 or other engagement features that facilitate coupling multiple modular thrust units together. Additionally, the holes 125 may also be included to reduce the weight and/or improve the balance of the modular thrust unit 110. The number, size, configuration, and arrangement of the holes 125 may be dependent on a specific application. The base 120 may be constructed from one or more materials such as metals, composites, plastics, polymers, etc. Additional details relating to the base 120 are included below with reference to the remaining figures.

Figure 2A:
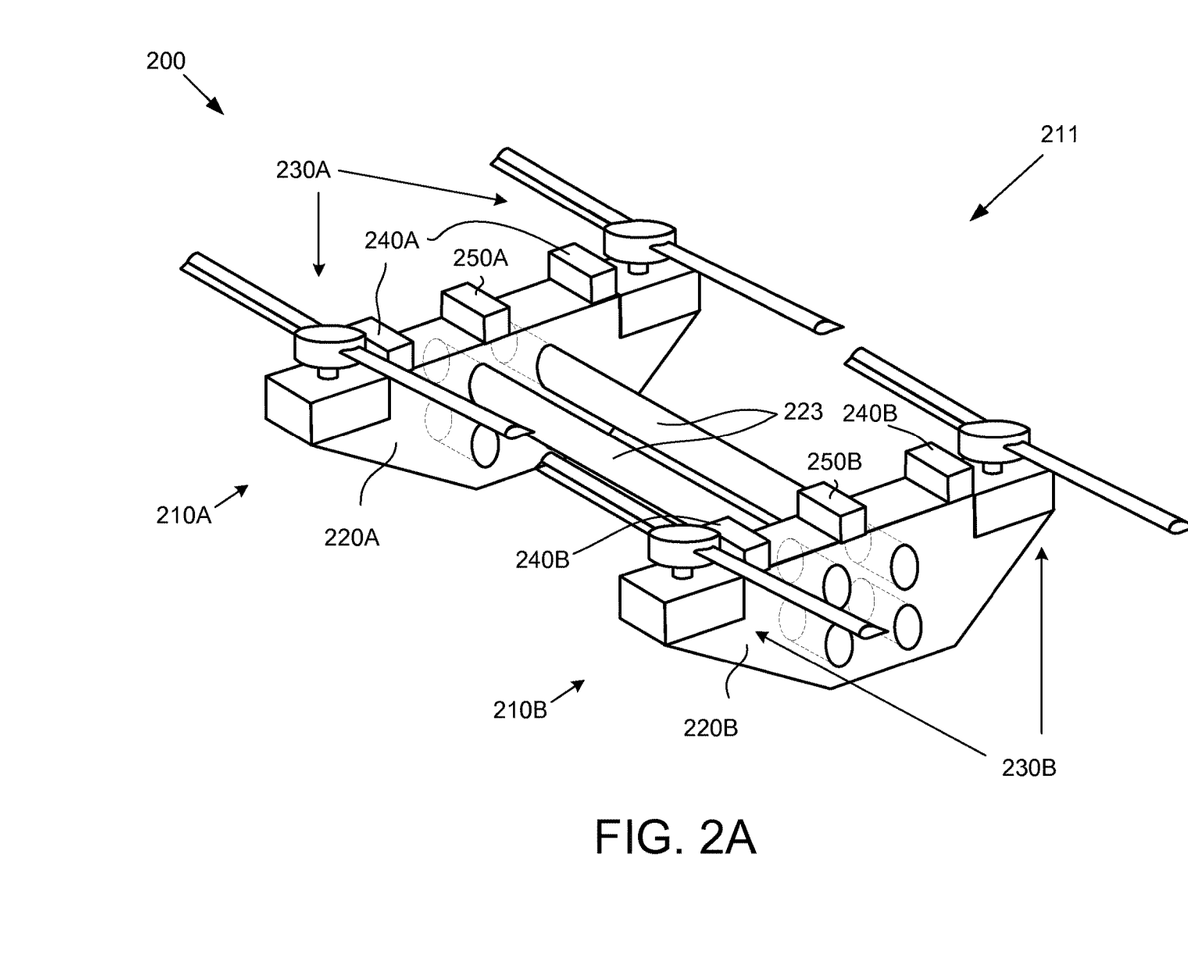
FIG. 2A is a top perspective view of one embodiment of a thrust system that includes two modular thrust units forming an aggregated thrust unit.
Figure 2B:
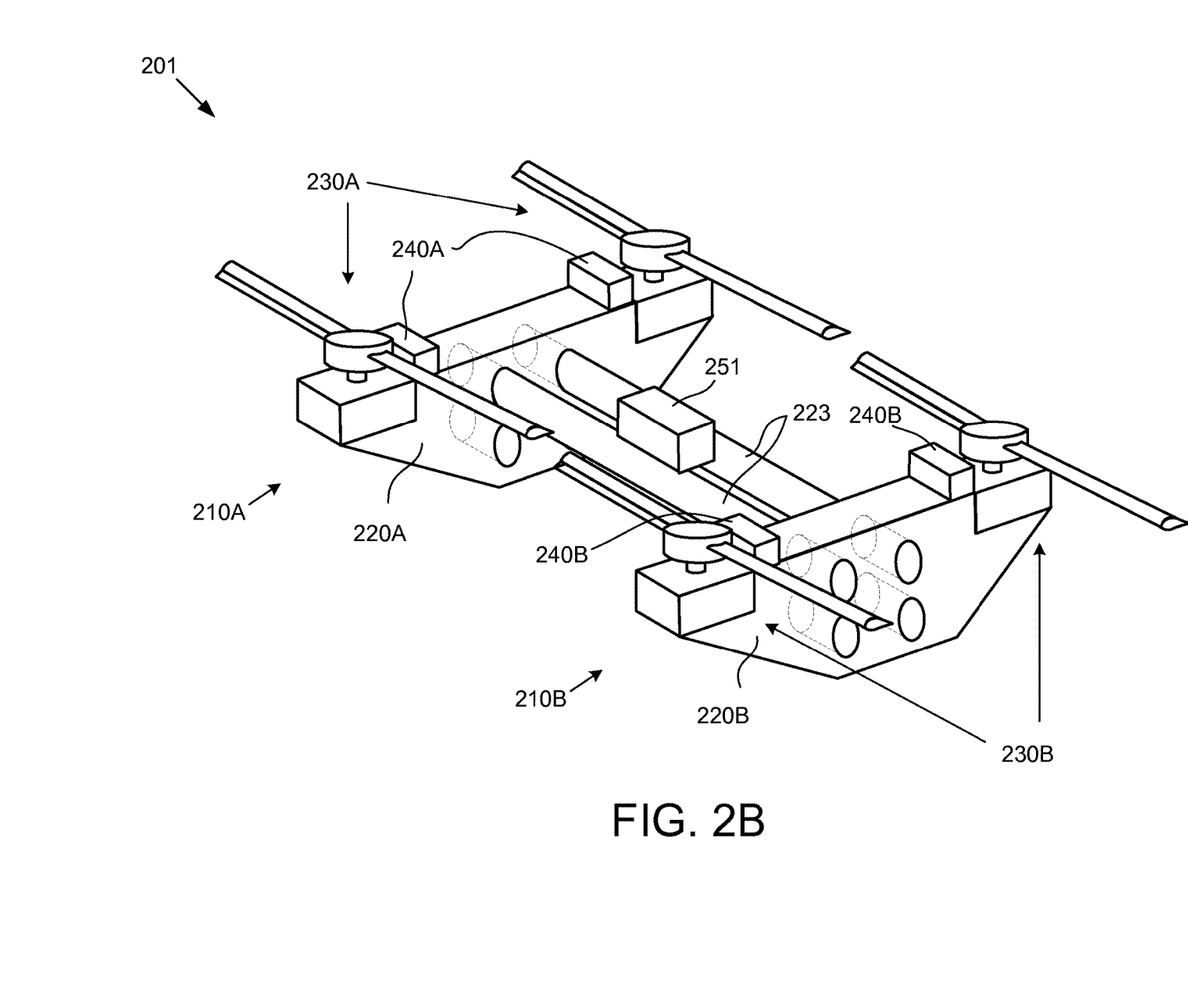
FIG. 2B is a top perspective view of one embodiment of the thrust system of FIG. 2A, but with a single control module.
Figure 3:
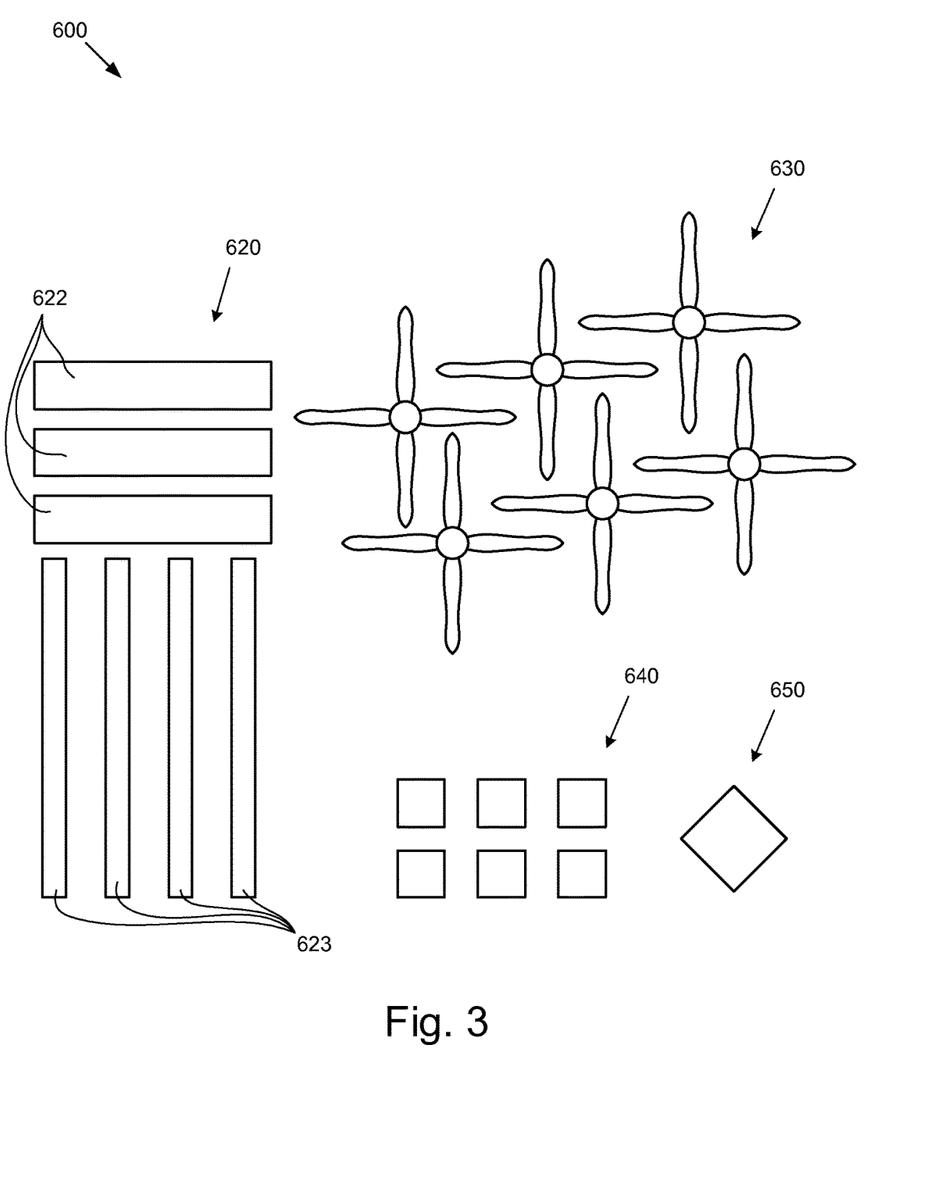
FIG. 3 is a top view of one embodiment of components of a thrust kit that includes structural members, a plurality of thrust generators, a plurality of power sources, and at least one control module.

The two thrust generators 130 depicted in the embodiment of the modular thrust unit 110 each include a rotor 131 (e.g., rotary wings) that is driven by a motor 132. Throughout the remaining figures, various embodiments of motor-driven rotors are shown to represent the thrust generators of the thrust system. For example, FIGS. 1-2B show motor driven rotors that each have two rotary wings, FIGS. 3-5 show motor-driven rotors that each have three rotary wings, and FIGS. 6 and 8-10 show motor-driven rotors that each have four rotary wings. Accordingly, it is expected that different styles of motor-driven rotors may be implemented as the thrust generators of the thrust system. However, in another embodiment, other mechanisms (non-rotor type) may be implemented as the thrust generators. For example, although not depicted and not extensively described herein, air-blade assemblies and/or jet-propulsion assemblies may be implemented as the thrust generators, among others. In other words, the thrust generators of the present disclosure may refer to any mechanism, assembly, or device that is capable of creating a directional thrust.

In one embodiment, the rotational direction of the rotor for each thrust generator may be configured so as to balance the torque that results from the rotation of the rotors. For example, the modular thrust unit in FIG. 1, which includes two thrust generators 130, may be configured so that the rotors spin in opposite directions to balance the torque forces to prevent (or at least minimize) torque feedback to the user of the thrust unit. In applications where the thrust unit will be utilized to create level flight, for example, it would be beneficial for the torques to be balanced by having two thrust generators spin in opposite directions. However, in other embodiments the generated torque feedback may be desirable in certain applications.

The thrust generators 130 are depicted as being coupled to opposing ends of the base 120. In another embodiment, as described above, the modular thrust unit 110 may include a single thrust generator coupled at a central location of the base or the modular thrust unit 110 may have multiple thrust generators at various positions along the base 120. As described in greater detail below, the thrust generators 130 may be coupled to the base 120 via various fastener mechanisms.

The power sources 140 of the thrust system 100 are represented schematically as rectangular boxes coupled to the base 120 of the modular thrust unit 110. The shape, relative size, position, arrangement, and configuration of an actual power source 140 implemented with the thrust system 100 may dependent on a specific application. Generally, the power sources 140 are operable to deliver power to the thrust generators 130. Accordingly, the type of power source 140 is associated with and dependent on the type of thrust generator 130 implemented. For example, the power sources 140 may be electrical energy storage devices (e.g., batteries, capacitors) that are electrically connected to the motor 132 that drives the rotation of the rotor 131. However, in another embodiment the power sources 140 may be pneumatic or hydraulic vessels that are in fluid contact with a thrust generator, wherein a working fluid stored within the power sources 140 is deliverable to and/or dischargeable via the thrust generators in order to create the thrust force. In a further embodiment, the power sources 140 may be fuel storage tanks that deliver fuel to be consumed (i.e., combusted) by an internal combustion engine that drives the rotor or other thrust creating mechanism.

As briefly described above, the number, configuration, placement, and arrangement of the power sources 140 and the thrust generators 130 are not limited to the embodiments depicted in the figures. For example, while the modular thrust unit 110 in FIG. 1 has a power source 140 for each thrust generator 130, it is expected that multiple thrust generators 130 may receive power from a single power source. It is also expected that multiple power sources 140 may be utilized to power each thrust generator 130. The power sources 140 are also depicted as being substantially independent from the thrust generators 130. In another embodiment, the power sources 140 may be integrated with the thrust generators 130. In yet another embodiment, the power sources 140 may be housed within the base 120.

The control module 150 of the thrust system 100 of FIG. 1 is represented schematically as a rectangular box coupled to the base 120 of the modular thrust unit 110. The control module 150 is configured to control the thrust generators 130 and the power sources 140. The control module 150 may include an antenna or other such communication device that allows a user to remotely control operation of the thrust system 100. In one embodiment, the control module 150 may include stored automated instructions pertaining to a certain thrust application or at least may be able to receive such automated instructions and attend to actuating the thrust system 100 accordingly. Once again, the shape, relative size, position, arrangement, and configuration of an actual control module 150 implemented with the thrust system 100 may dependent on a specific application. Additional details regarding the thrust system are included below with reference to the remaining figures.

FIG. 2A is a top perspective view of one embodiment of a thrust system 200 that includes two modular thrust units 210A, 210B that form an aggregated thrust unit 211. As described above, the thrust system 200 may include interconnected modular thrust units 210A, 210B. While two modular thrust units 210A, 210B are depicted in FIG. 2A, it is expected that more than two modular thrust units may be coupled together to form the aggregated thrust unit 211. Accordingly, each of the modular thrust units 210A, 210B is independently operable as well as interdependently operable. That is, depending on the specific thrust application, the thrust system may be modified or adapted to meet the requirements/demands of the specific thrust application. For example, if the thrust system is to be utilized as an air vehicle to transport items, the number of thrust generators 230A, 230B on each modular thrust unit 210A, 210B and/or the number of modular thrust units 210A, 210B coupled together in the aggregated thrust unit 211 may depend on the weight, dimensions, and bulk of the item to be transported.

As depicted, the two modular thrust units 210A, 210B are coupled together via connecting structural members 223. The connecting structural members 223, for example, may be engageable within the holes 125 of the bases 220A, 220B of the modular thrust units 210A, 210B to allow multiple modular thrust units 210A, 210B to be detachably coupled together. The connecting structural members 223 may be detachably secured via conventional coupler mechanisms. In one embodiment, instead of using connecting structural members 223 that have a shape/size that differs from the base 220A, 220B of the modular thrust units 210A, 210B, extra bases that have the same configuration as the bases 220A, 220B of the modular thrust units 210A, 210B may be implemented to couple thrust units together. In other words, a thrust system may include only a single type of structural member or base to which the thrust generators are coupled and with which modular thrust units 210A, 210B are coupled together.

In one embodiment, the coupler mechanisms may include terminals for connecting and conveying power and/or command signals between the interconnected modular thrust units as well as structural connection means for securely mechanically coupling the thrust units together. For example, a coupler mechanism may include spring-loaded lock pins, release button mechanisms, interlocking elements, etc.

FIG. 2A also shows two separate control modules 250A, 250B, one for each of the modular thrust units 210A, 210B. In one embodiment, both control modules 250A, 250B may be active and a user or automated program may control the operation of the thrust system 200 through both control modules 250A, 250B. In another embodiment, one of the two control modules 250A, 250B may be deactivated or at least configured to be a slave controller, thereby allowing the other of the two control modules 250A, 250B to be the primary controller. In yet another embodiment, a single control module 251 (see FIG. 2B) may be implemented as the exclusive controller for the system. FIG. 2B is a top perspective view of such an embodiment, with the single control module 251 controlling the operation of the thrust system 201. In another embodiment, the control module 251 may not be housed within a single unit, but instead may be implemented as various circuits integrated within the various components of the thrust system 201.

In one embodiment, the thrust system includes a modular thrust unit with a base that has an alternative structure than depicted in FIGS. 1-2A. The base of the modular thrust unit may be an x-frame with thrust generators coupled to each arm of the x-frame. As described below with reference to FIGS. 5 and 6, the shape and configuration of the base may have other forms that are not explicitly disclosed herein. The base may include four arms extending outward from a center node. The base may be a single, unitary material or the base may be constructed from multiple structural members. For example, each arm may be detachably coupled to the center node. In one embodiment, the thrust system may include multiple different center nodes, each configured to join a different number of arms in a plurality of different configurations.

The thrust generators may be coupled to the base at predetermined locations (i.e., at locations with coupler elements that facilitate the coupling between the thrust generators and the base), or the thrust generators may be positioned at substantially any location along the base. The number, position, and arrangement of the thrust generators on the base are defined as the thrust configuration. The base may include hollow structural members, such as tubes or pipes, through which control lines and power lines are routed to the various components of the system. The power sources, according to one embodiment, may be coupled directly to the base adjacent to (i.e., underneath) each of thrust generators. In another embodiment, the power sources may be integrated with the thrust generators or the power sources may not be adjacent the thrust generators and may instead be centrally located near the center node to centralize the center of gravity of the modular thrust unit. The control module may also be centrally located adjacent the central node, or each of the thrust generators may have an accompanying control module (not depicted) that is integrated with or adjacent to each thrust generator 330. As described above, the control module and/or the power sources may be housed within the base/structure of the modular thrust units.

The base may also include distal portions that are configured to be connectable with other modular thrust units. For example, the distal portions may include multiple coupler mechanisms (not depicted) that facilitate each distal portion detachably coupling to multiple other distal portions on other modular thrust units. In one embodiment, the system includes multiple modular thrust units being coupled together to form an aggregated thrust unit. In one embodiment, the formed aggregated thrust unit shows coupler mechanisms between adjacent distal portions of neighboring modular thrust units.

FIG. 3 is a top view of one embodiment of components of a thrust kit 600 that includes structural members 620, a plurality of thrust generators 630, a plurality of power sources 640, and at least one control module 650. The thrust kit 600 includes components that are coupleable together in a plurality of configurations to form a thrust system. The structural members of the thrust kit 600, according to one embodiment, may include a single type of structural element (such as just structural members 622), or the structural members 620 of the thrust kit 600 may include multiple different types of structural elements as shown. FIG. 3 shows one example of how the structural members 620 of the thrust kit 600 may include base structural members 622 and connecting structural members 623, similar to the thrust system depicted in FIGS. 2A and 2B. The number and type of structural members 620 in the thrust kit 600 may be dependent on the number and type of thrust applications a user may expect to encounter.

The thrust generators 630, as described previously, may be any mechanisms or assemblies that are able to create directional thrust. Although depicted as motorized rotors, the thrust generators 630 of the thrust kit 600 may consist of multiple types of thrust generators and may consist of any number of thrust generators, depending on the specifics of an expected set of thrust applications. The thrust kit 600 further includes a plurality of power sources 640 and at least one control module 650. In one embodiment, the number of power sources 640 to the number of thrust generators 630 in the thrust kit 600 may be 1:1. However, in another embodiment, there may be more of one or the other of the power sources 640 and the thrust generators 630 in the thrust kit 600. The at least one control module 650, as described above, is operable to control thrust generators 630 and/or the power sources 640 once the components of thrust kit are inter-coupled to form one or more modular thrust units of the thrust system. Therefore, the thrust kit 600 depicted in FIG. 3 shows one possible thrust kit of a plurality of thrust kits. In other words, the thrust kit of the present disclosure includes at least one structural member, at least one thrust generator, at least one power source, and at least one control module, according to one embodiment. FIGS. 5A-D show four examples (of many) of the modular thrust units that can be configured using the thrust kit 600.

Figure 4:
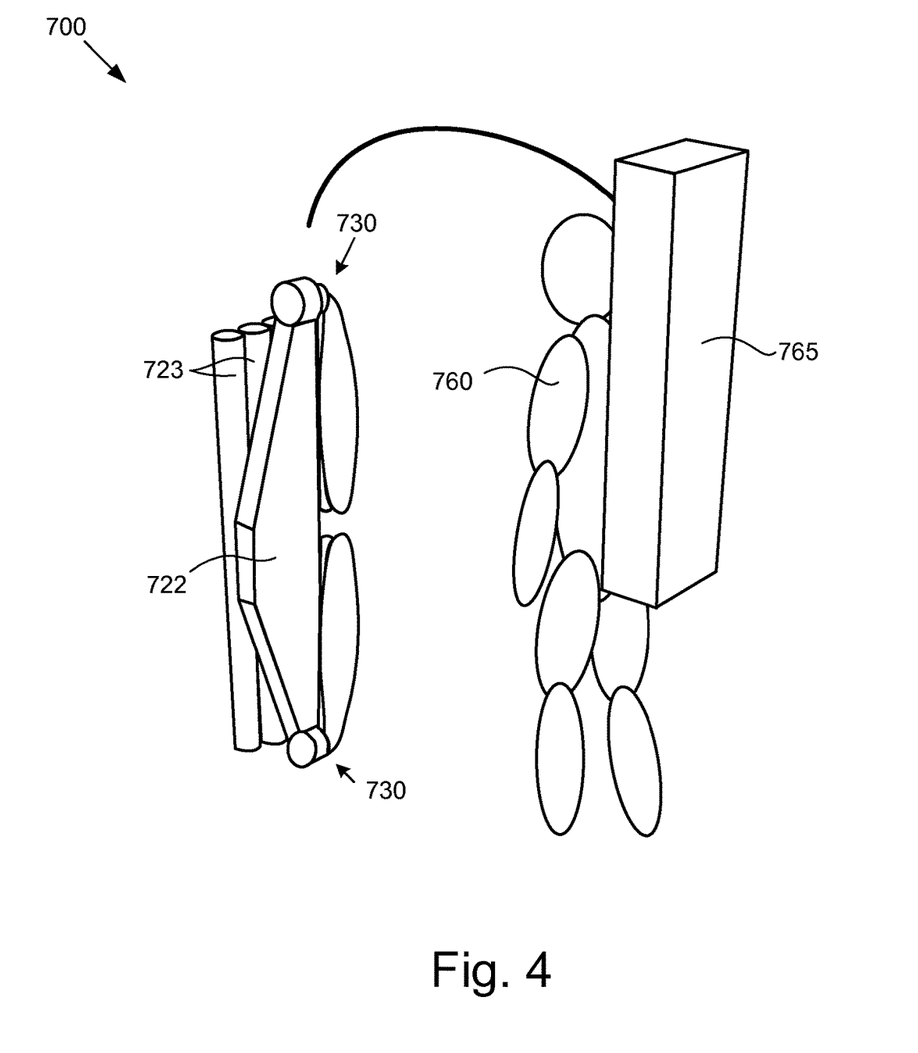
FIG. 4 is a perspective view of one embodiment of components of a thrust kit and an accompanying personal storage/transport case.

FIG. 4 is a perspective view of one embodiment of components of the thrust kit 700 collapsed and arranged in a condensed fashion so as to be storable within an accompanying personal transport case 765. For example, first and second structural members 722, 723, power sources (not depicted), thrust generators 730, and at least one control module (not depicted) may be arrangeable so as to be stored within the personal transport case 765. In such an embodiment, a user 760 may, for example, select a kit that has been pre-packaged for a specific thrust application or the user 760 may select components from a larger thrust kit to transport in the transport case 765.

Figure 5A:
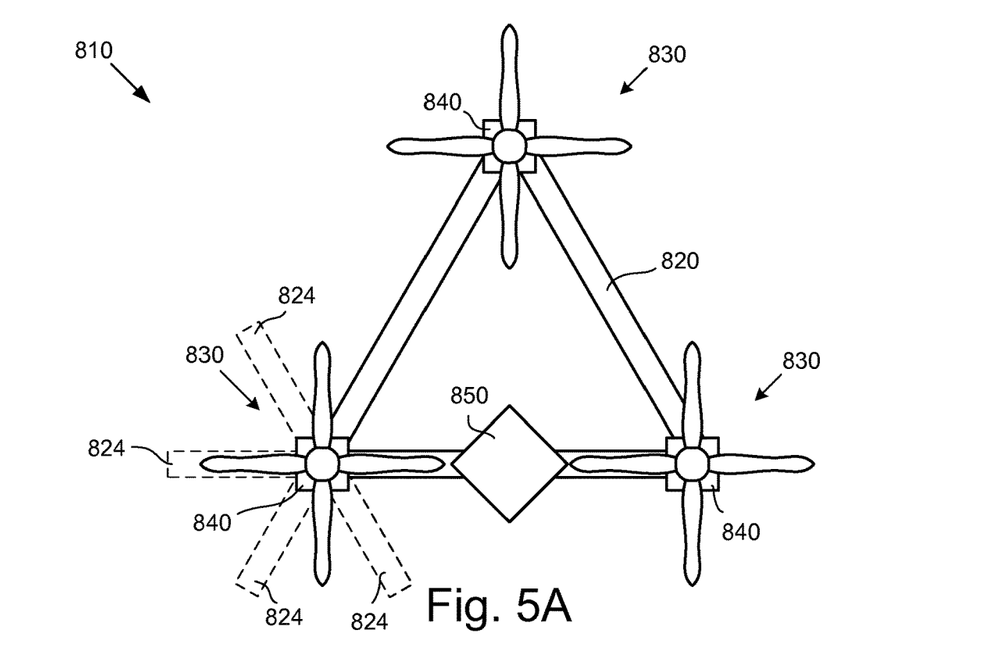
FIG. 5A is a top view of one embodiment of a thrust system that is formable from the thrust kit.

FIG. 5A is a top view of one embodiment of a possible modular thrust unit 810 that can be formed from the thrust kit 600. The embodiment of the modular thrust unit 810 depicted in FIG. 5A includes three structural members 820 coupled together in a triangular shape, with a thrust generator 830 coupled to the structural members 820 at the corner junctions of the structural members 820. The modular thrust unit 810 also includes, for example, a single control module 850 coupled to one of the structural members 820. The modular thrust unit 810 has power sources 840 coupled adjacent to each of the thrust generators 830. The modular thrust unit 810 may also be optionally configured to include structural members 820 that have distal portions 824 that enable, through the use of coupler mechanisms, other substantially identical thrust units to be coupled together to form an aggregated thrust unit. In other words, the modular thrust unit 810, according to one embodiment, is a repeatable unit that can be coupled with other like units to form an aggregated thrust unit, thus enabling a user to scale the thrust system per the load requirements of a given thrust application.

Figure 5B:
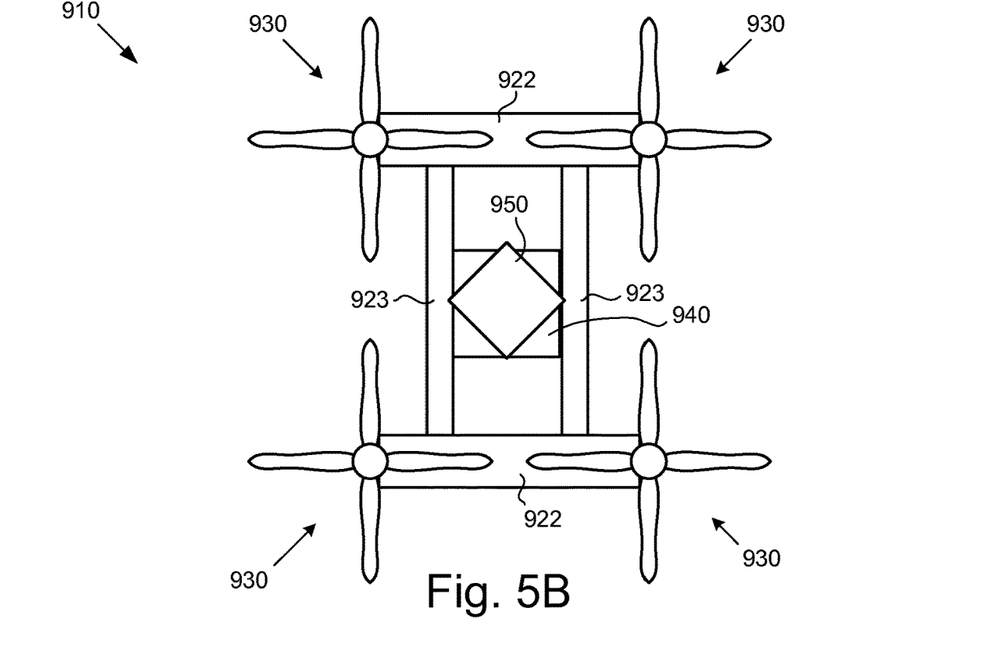
FIG. 5B is a top view of another embodiment of a thrust system that is formable from the thrust kit.

FIG. 5B is a top view of another embodiment of a possible modular thrust unit 910 that can be formed from the thrust kit 600. The embodiment of the modular thrust unit 910 depicted in FIG. 5B includes two base structural members 922 and two connecting structural members 923 coupled together in a rectangular shape, with a thrust generator 930 coupled to each end of the base structural members 922. The modular thrust unit 910 also includes, for example, a single control module 950 coupled in the center of the structural members 922, 923. The modular thrust unit 910 may have a single power source 940 coupled in the center of the structural members 922, 923. The modular thrust unit 910 may also be optionally configured to include structural members 922, 923 that are configured to be connectable with other modular thrust units to form an aggregated thrust unit. In other words, the modular thrust unit 910, according to one embodiment, is a repeatable unit that can be coupled with other like units to form an aggregated thrust unit, thus enabling a user to scale the thrust system per the load requirements of a given thrust application.

Figure 5C:
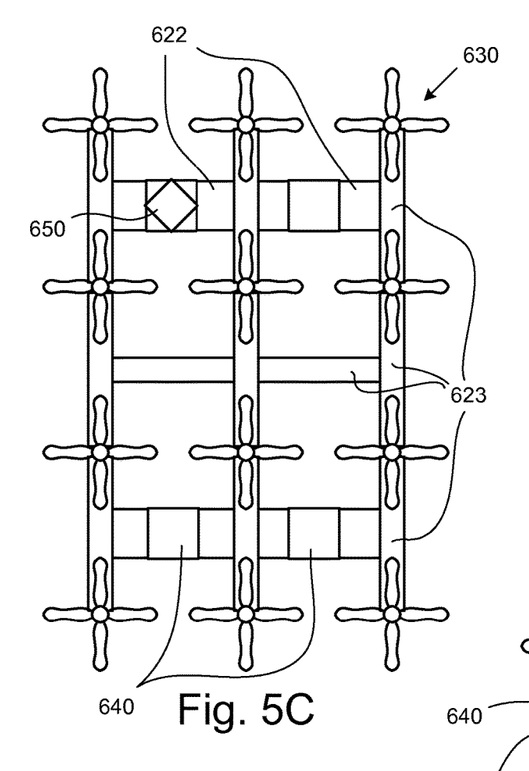
FIG. 5C is a top view of another embodiment of a thrust system that is formable from the thrust kit.
Figure 5D:
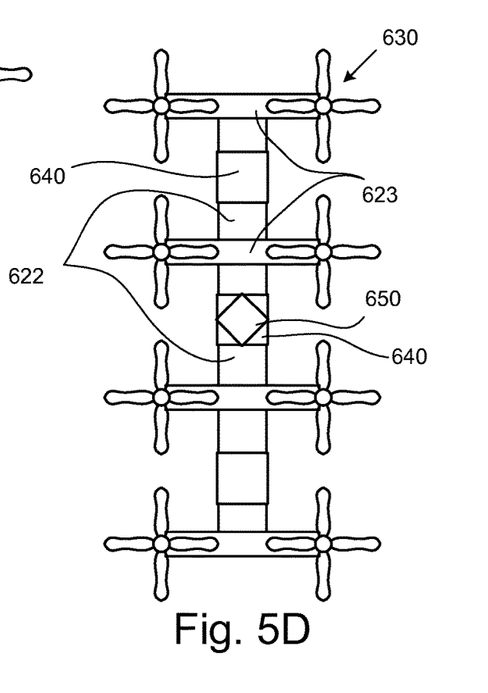
FIG. 5D is a top view of yet another embodiment of a thrust system that is formable from the thrust kit.

FIG. 5C is a top view of another embodiment of a thrust system that is formable from the thrust kit 600. The embodiment depicted in FIG. 5C includes structural members 622, 623 that are interconnected to form the structural framework for the thrust system. As depicted, twelve thrust generators 630 may be coupled to the structural members 622, 623 with four power sources 640. As described previously, the ratio of the number of thrust generators to the number of power sources may not be 1:1. For example, depending on the size, characteristics, and capacity of the power sources, multiple thrust generators may be powered by each power source. Conversely, in another embodiment multiple power sources may be used to power each thrust generator. The depicted system also includes a single control module 650. FIG. 5D shows a similar embodiment, but with six thrust generators 630 and three power sources 640, resulting in a thrust generator to power source ratio of 2:1. The embodiment of the thrust system in FIG. 5D also shows how pairs of thrust generators may be coupled to the end sections of second structural members 623 with first structural members 622 interconnecting adjacent thrust generator pairs.

Figure 6A:
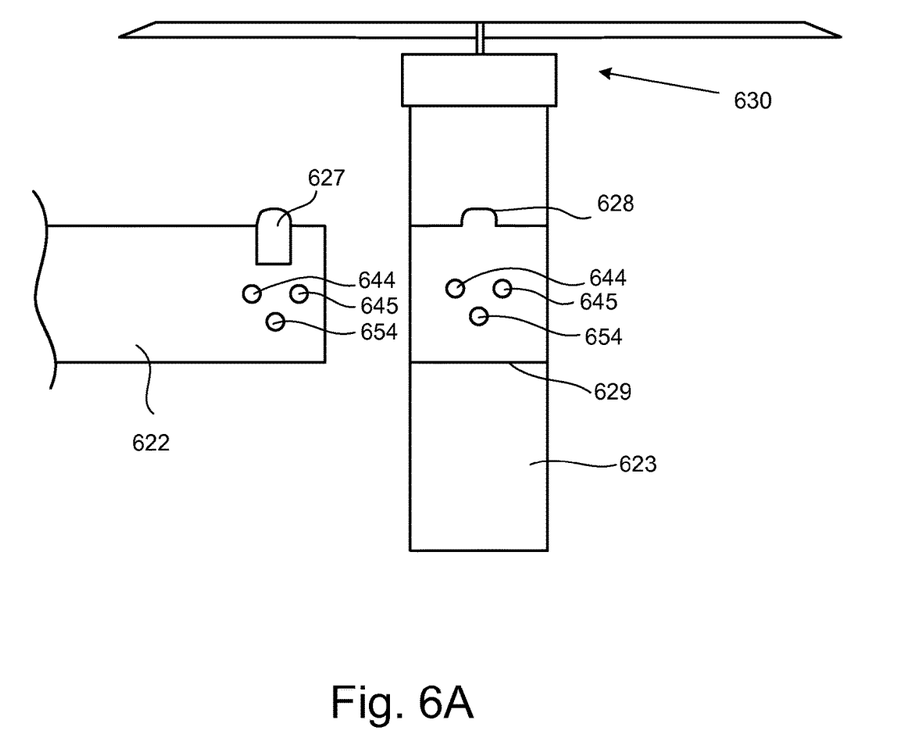
FIG. 6A is a cross-sectional side view of one embodiment of a coupler mechanism.

FIG. 6A is a cross-sectional side view of one embodiment of a coupler mechanism. A first structural member 622 may be detachably coupled to a second structural member 623 via a pin-locked engagement. For example, a pin 627, which can be a spring-loaded pin, disposed on an end portion of the first structure member 622 may be configured to engage a corresponding groove 628 in the second structural member 623 when the end portion of the first structural member 622 is inserted within a corresponding borehole/cavity 629 of the second structural member 623. In such an embodiment, a quick-release lever may also be incorporated (not depicted) to disengage the pin 627 from the groove 628 and thereby decouple the two structural members 622, 623. In additional the mechanical/structural coupling, the coupler mechanism may further provide electronic communication and/or power supply communication between the two structural members 622, 623. For example, corresponding control communication terminals 654 may be coupled together simultaneous with the mechanical coupling of the structural members 622, 623. Also, power supply communication, such as electrical communication, between the power sources and the thrust generators may be accomplished via corresponding power supply terminals 644, 645 on the structural members 622, 623 (e.g., positive and negative electrical terminals).

Figure 6B:
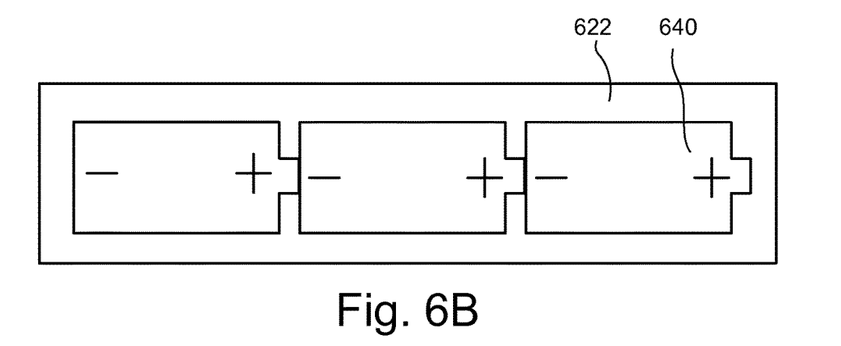
FIG. 6B is a schematic diagram of one embodiment of batteries housed within a structural member.

FIG. 6B is a schematic diagram of one embodiment of power sources 640 (e.g., batteries) housed within a structural member 622. As described above, the number, configuration, placement, and arrangement of the power sources and the thrust generators are not limited to the embodiments depicted in the figures. For example, a plurality of power sources 640 may be connected together in series, according to one embodiment, and the power sources 640 may be housed within the structural members 622.

Figure 7:
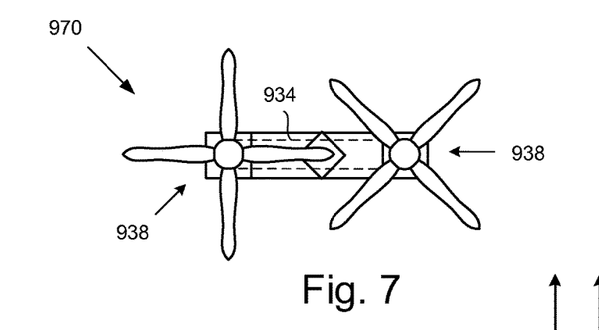
FIG. 7 is a top view of one embodiment of a thrust system that includes a synchronization element between two thrust generators.

FIG. 7 is a top view of one embodiment of the thrust system 970 that includes a synchronization element 934 between two thrust generators 938. The thrust system and the thrust kit may further include other elements and features that facilitate certain configurations. For example, a synchronization element 934 (such as a belt, chain, or drive) may be included that synchronizes the rotation of the rotors of two adjacent thrust generators 938 in order to allow the thrust generators 938 to be positioned closer together (e.g., the footprints of the spinning rotors of the two thrust generators 938 overlap).

Figure 8:
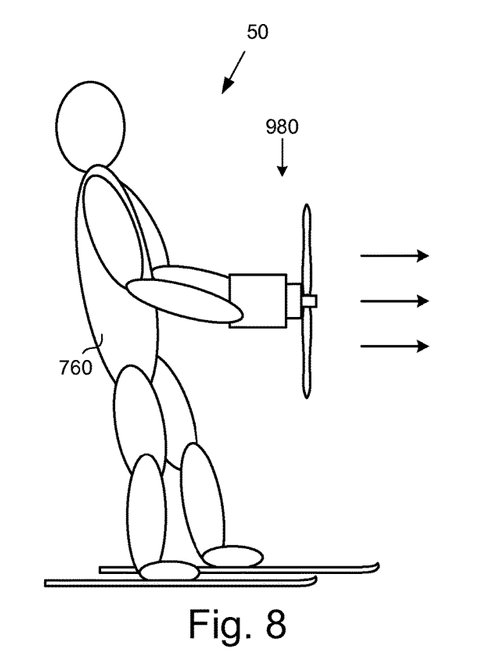
FIG. 8 is a side view of one embodiment of a user employing a thrust system in a first thrust application.
Figure 9:
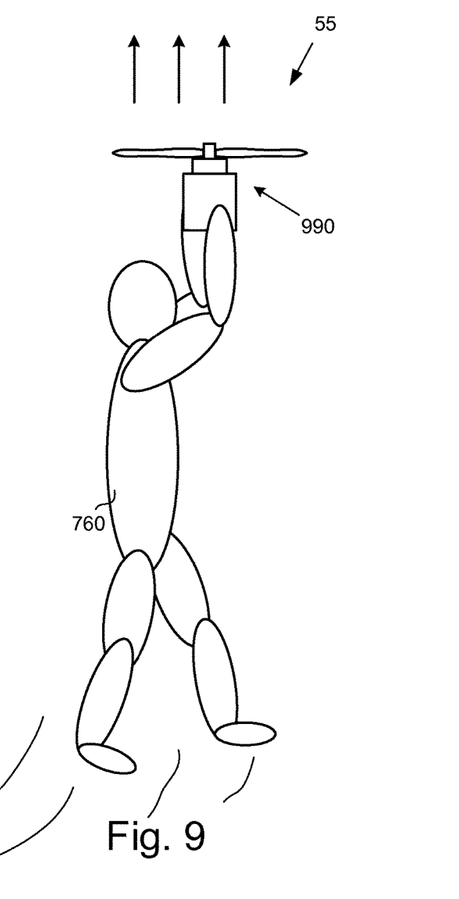
FIG. 9 is a side view of one embodiment of a user employing a thrust system in a second thrust application.

FIG. 8 is a side view of one embodiment of a user 760 employing a thrust system 980 in a first thrust application 50. As described above, the modular thrust system may be employed in a variety of different circumstances where thrust is needed. For example, the first thrust application 50 may be associated with a user 760 desiring to traverse snow using skis or other sliding devices, the components of the thrust kit may be configured to form one or more modular thrust units that form a specific thrust system that is specifically tailored for the first thrust application 50. FIG. 9 is a side view of one embodiment of the user 760 employing the thrust system 980 in a second thrust application 55. The second thrust application 55 may require the user 760 to employ the thrust system 990 as an air vehicle for transporting people and/or cargo.

Figure 10:
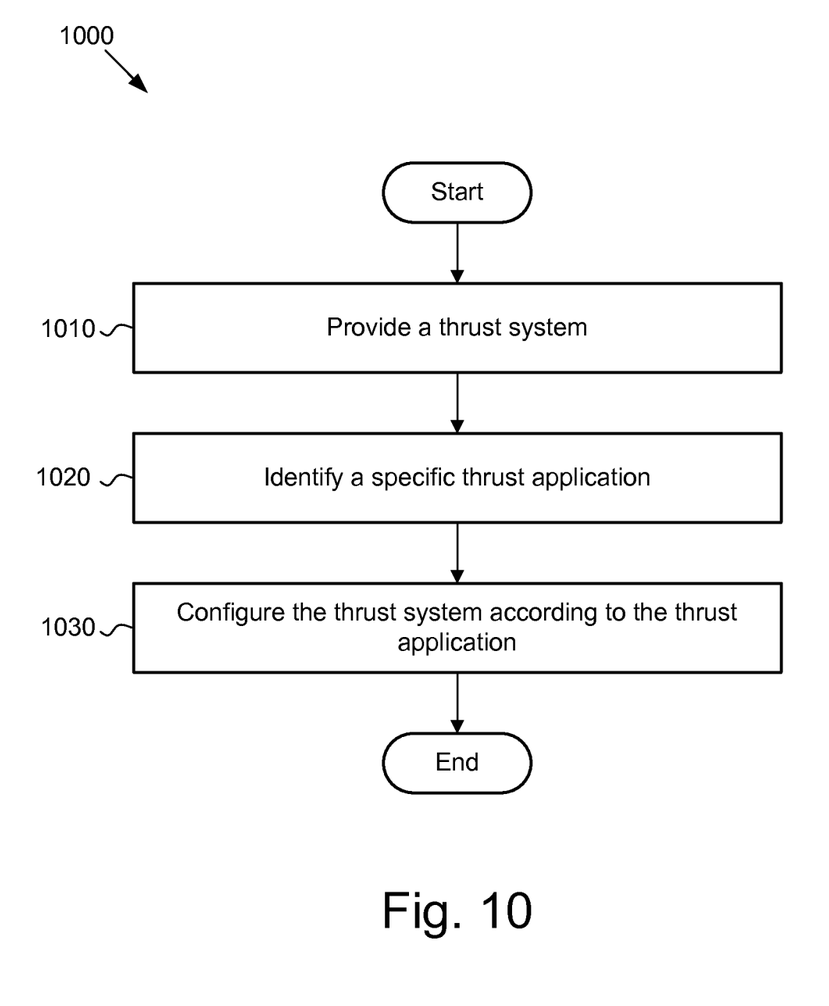
FIG. 10 is a schematic flowchart diagram of one embodiment of a method for using a thrust kit.

FIG. 10 is a schematic flowchart diagram of one embodiment of a method 1000 for using a thrust kit. The method 1000 includes providing a thrust kit that is configurable in a plurality of different configurations at 1010. In one embodiment, each configuration is associated with (e.g., tied to) at least one thrust application of a plurality of different thrust applications. The method 1000 further includes identifying a specific thrust application from the plurality of different thrust applications at 1020, and then, at 1030, configuring the thrust kit to have the specific configuration, of the plurality of different configurations, that is associated with the specific thrust application identified.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages (e.g., LabVIEW). The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A thrust system, comprising:
   at least one modular thrust unit, wherein the modular thrust unit comprises:
     a base comprising structural members inter-connectable in a plurality of different structural configurations having different shapes;
     at least one thrust generator coupleable to the base in a thrust configuration and having a shape different from a shape of each of the structural members of the base, the at least one thrust generator separable from the base to at least partially collapse the modular thrust unit for transport, wherein the at least one thrust generator is unpowered in response to being uncoupled from the base; and
     at least one power source operable to deliver power to the at least one thrust generator; and
   at least one control module coupleable to the at least one modular thrust unit and operable to control at least one of the at least one thrust generator and the at least one power source.

2. The thrust system of claim 1, wherein the base comprises at least one coupler mechanism for coupling together at least one other modular thrust unit to form an aggregated thrust unit.

3. The thrust system of claim 1, wherein the at least one modular thrust unit comprises a plurality of modular thrust units, wherein each modular thrust unit is independently operable to generate thrust and the plurality of modular thrust units are interdependently operable to generate thrust, wherein the plurality of modular thrust units are intercoupleable to form an aggregated thrust unit with an aggregated configuration.

4. The thrust system of claim 1, wherein the thrust system consists of:
   the at least one modular thrust unit, wherein each modular thrust unit consists of:
     the base comprising structural members inter-connectable in the plurality of different structural configurations;
     the at least one thrust generator coupleable to the base in the thrust configuration; and
     the at least one power source operable to deliver power to the at least one thrust generator; and
   the at least one control module coupleable to the at least one modular thrust unit and operable to control at least one of the at least one thrust generator and the at least one power source.

5. A thrust system, comprising:
   a plurality of collapsible modular thrust units, wherein each collapsible modular thrust unit comprises:
     a base;
     at least one thrust generator coupleable to the base to provide the only source of thrust for the base in a thrust configuration, the at least one thrust generator being separable from the base to at least partially collapse each of the plurality of collapsible modular thrust units, wherein the at least one thrust generator is unpowered in response to being uncoupled from the base; and at least one power source operable to deliver power to the at least one thrust generator; and at least one control module coupleable to at least one of the plurality of modular thrust units and operable to control at least one of the at least one thrust generator and the at least one power source;

wherein each modular thrust unit is independently operable to generate thrust and the plurality of modular thrust units are interdependently operable to generate thrust, wherein the plurality of modular thrust units are inter-coupleable to form an aggregated thrust unit having an aggregated configuration having any one of various different shapes.

6. The thrust system of claim 5, wherein the plurality of modular thrust units comprises:

first modular thrust units each comprising a first base having a first structural configuration; and second modular thrust units each comprising a second base having a second structural configuration, wherein the first structural configuration is different from the second structural configuration.

7. The thrust system of claim 5, wherein the base comprises structural members inter-connectable in a plurality of different structural configurations.

8. The thrust system of claim 7, wherein each of the plurality of modular thrust units has identical structural configurations and identical thrust configurations.

9. The thrust system of claim 5, wherein each modular thrust unit comprises an equal number of thrust generators and power sources.

10. The thrust system of claim 5, wherein the aggregated thrust unit comprises a single control module of the at least one control module.

11. The thrust system of claim 5, wherein the at least one control module comprises a control module for each modular thrust unit that forms the aggregated thrust unit.

12. The thrust system of claim 11, wherein the control modules for each modular thrust unit are networked together, wherein one of the control modules is a master controller and others of the control modules are slave controllers.

13. The thrust system of claim 5, wherein the base comprises at least one coupler mechanism for coupling together multiple modular thrust units to form the aggregated thrust unit.

14. The thrust system of claim 5, wherein each thrust generator of the at least one thrust generator comprises a rotor.

15. A kit, comprising:

a plurality of structural members inter-connectable to form a base having any one of a plurality of configurations having different shapes;

at least one thrust generator coupleable to the base in a thrust configuration and having a shape different from a shape of each of the plurality of structural members of the base, the at least one thrust generator separable from the base to at least partially collapse the kit, wherein the at least one thrust generator is unpowered in response to being uncoupled from the base;

at least one power source coupleable to the base and operable to deliver power to the at least one thrust generator; and at least one control module coupleable to the base and operable to control at least one of the at least one thrust generator and the at least one power source.

16. A method comprising:

providing a collapsible thrust kit that is configurable in a plurality of different configurations having different shapes, wherein each configuration is associated with at least one thrust application of a plurality of different thrust applications;

identifying a specific thrust application from the plurality of different thrust applications; and configuring the thrust kit to have a specific configuration, of the plurality of different configurations, that is associated with the identified specific thrust application, wherein configuring the thrust kit comprises detachably coupling at least one thrust generator to a base to provide the only source of thrust for the base, the base receiving a power source, the at least one thrust generator comprising a number of thrust generators selected based on the identified specific thrust application and coupled to the base, and the power source comprises a number of power sources selected, separately from the selected number of thrust generators, based on the identified specific thrust application and based on the selected number of thrust generators.

17. The method of claim 16, wherein the thrust kit comprises:

a plurality of structural members inter-connectable in a plurality of different structural configurations to form the base;

the at least one thrust generator coupleable to the base in a thrust configuration;

at least one power source coupleable to the base and operable to deliver power to the at least one thrust generator; and at least one control module coupleable to the base and operable to control at least one of the at least one thrust generator and the at least one power source.

18. The method of claim 17, wherein configuring the thrust kit comprises configuring the structural members to have a specific structural configuration associated with the identified specific thrust application.

19. The method of claim 16, wherein the thrust kit may be utilized to form a plurality of modular thrust units, wherein each modular thrust unit is independently operable to generate thrust and the plurality of modular thrust units are interdependently operable to generate thrust, wherein the plurality of modular thrust units are inter-coupleable to form an aggregated thrust unit having an aggregated configuration, wherein configuring the thrust kit comprises configuring the aggregated thrust unit to have a specific aggregated configuration.

20. The method of claim 16, further comprising using the thrust kit with the specific configuration for the specific thrust application.

* * * * *